United States Patent
Krenzer et al.

(10) Patent No.: US 11,123,808 B2
(45) Date of Patent: Sep. 21, 2021

(54) METAL DRILLING TOOL

(71) Applicant: MAPAL FABRIK FÜR PRÄZISIONSWERKZEUGE DR. KRESS KG, Aalen (DE)

(72) Inventors: Ulrich Krenzer, Wolfertschwenden (DE); Paul Friedli, Solothurn (CH)

(73) Assignee: MAPAL FABRIK FUR PRAZISIONSWERKZEUGE DR. KRESS KG, Aalen (DE)

( * ) Notice: Subject to any disclaimer, the term of this patent is extended or adjusted under 35 U.S.C. 154(b) by 1 day.

(21) Appl. No.: 16/337,643

(22) PCT Filed: Oct. 5, 2017

(86) PCT No.: PCT/EP2017/075418
§ 371 (c)(1),
(2) Date: Mar. 28, 2019

(87) PCT Pub. No.: WO2018/065550
PCT Pub. Date: Apr. 12, 2018

(65) Prior Publication Data
US 2020/0030893 A1    Jan. 30, 2020

(30) Foreign Application Priority Data

Oct. 7, 2016 (CH) ..................................... 01349/16
Feb. 2, 2017 (DE) ..................... 10 2017 201 684.1

(51) Int. Cl.
*B23B 51/02* (2006.01)

(52) U.S. Cl.
CPC .......... *B23B 51/02* (2013.01); *B23B 2251/04* (2013.01); *B23B 2251/14* (2013.01);
(Continued)

(58) Field of Classification Search
CPC . B23B 51/02; B23B 2251/04; B23B 2251/14; B23B 2251/18; B23B 2251/202; Y10T 408/9097
See application file for complete search history.

(56) References Cited

U.S. PATENT DOCUMENTS 2,600,286 A * 6/1952 Weiland ................. B27G 15/00
408/211
7,267,514 B2 * 9/2007 Wetzl ..................... B23B 51/02
408/225
(Continued)

FOREIGN PATENT DOCUMENTS

DE          3626523 A1    2/1988
DE     102007050050 A1    4/2009
(Continued)

OTHER PUBLICATIONS

International Search Report (in English and German) and Written Opinion (in German) issued in PCT/EP2017/075418, dated Jan. 5, 2018; ISA/EP.
(Continued)

*Primary Examiner* — Eric A. Gates
(74) *Attorney, Agent, or Firm* — Stephen T. Olson; Harness, Dickey & Pierce, P.L.C.

(57) ABSTRACT

A metal drilling tool comprising includes a middle axis, a front side and an opposite end, with at least two cutting edges arranged in a region of the front side, a first free surface being associated with each cutting edge. The at least two cutting edges lie on an imaginary first conical surface arranged concentrically in relation to the middle axis, with a first conical angle that opens up towards the opposite end and reaches a maximum of 180°. A centering section includes at least three edges, at least three side surfaces and an imaginary base surface. At least two of the edges lie on an imaginary second conical surface which is arranged (Continued)

concentrically in relation to the middle axis and has a second conical angle that opens up towards the opposite end. The second conical angle is smaller than the first conical angle, such that the imaginary second conical surface, seen from the opposite end, projects opposite the front surface.

19 Claims, 4 Drawing Sheets

(52) U.S. Cl.
 CPC ..... *B23B 2251/18* (2013.01); *B23B 2251/202* (2013.01); *Y10T 408/9097* (2015.01)

(56) References Cited

U.S. PATENT DOCUMENTS

| | | | |
|---|---|---|---|
| 7,497,282 B2 | 3/2009 | Batliner et al. | |
| 7,832,966 B2* | 11/2010 | Shultz | B23B 51/02 |
| | | | 408/224 |
| 8,342,781 B2* | 1/2013 | Soittu | B23B 51/06 |
| | | | 408/59 |
| 8,628,278 B2 | 1/2014 | Krenzer | |
| 8,834,080 B2 | 9/2014 | Kauper | |
| 8,979,445 B2 | 3/2015 | Sampath et al. | |
| 9,114,461 B2* | 8/2015 | Olsson | B24B 19/04 |
| 10,421,131 B2* | 9/2019 | Park | B23B 51/02 |
| 10,589,364 B2* | 3/2020 | Terashima | B23B 51/02 |
| 2004/0071516 A1* | 4/2004 | Hakenjos | B23B 51/02 |
| | | | 408/225 |
| 2005/0274551 A1 | 12/2005 | Batliner et al. | |
| 2010/0260567 A1 | 10/2010 | Kauper | |
| 2011/0085868 A1* | 4/2011 | Harouche | B23B 51/02 |
| | | | 408/229 |
| 2011/0103909 A1 | 5/2011 | Krenzer | |
| 2011/0268518 A1 | 11/2011 | Sampath et al. | |
| 2018/0257150 A1* | 9/2018 | Jia | B23B 51/08 |

FOREIGN PATENT DOCUMENTS

| | | | | |
|---|---|---|---|---|
| DE | 202010001892 U1 | 5/2010 | | |
| DE | 102013206549 A1 * | 10/2014 | | B23B 51/02 |
| EP | 0137898 A1 | 4/1985 | | |
| EP | 1604762 A1 | 12/2005 | | |
| WO | WO-2009027055 A1 | 3/2009 | | |

OTHER PUBLICATIONS

Written Opinion (translated in English) issued in PCT/EP2017/075418, dated Jan. 5, 2018.

* cited by examiner

METAL DRILLING TOOL

CROSS-REFERENCE TO RELATED APPLICATIONS

This application is a 371 U.S. National Stage of International Application No. PCT/EP2017/075418, filed Oct. 5, 2017, which claims priority to German Patent Application No. 10 2017 201 684.1, filed Feb. 2, 2017 and Swiss Patent Application No. 01349/16, filed Oct. 7, 2016. The entire disclosures of the above applications are incorporated herein by reference.

The invention relates to a metal drilling tool.

Metal drilling tools of the type discussed here are known. They are used to introduce holes into metal workpieces through chip-removing machining. Such tools have a middle axis, a peripheral surface, and a front side as well as an opposite end, in addition to at least two primary cutting edges that are arranged in the region of the front side. These emanate from the peripheral surface of the metal drilling tool and extend inwardly substantially in the direction of the middle axis. A chisel edge that intersects the middle axis is usually provided between the at least two primary cutting edges. It is true that this allows for satisfactory self-centering of the drill when drilling into surfaces that are flat and run perpendicular to the middle axis, at least if the length of the metal drilling tool is not too large and thus its inherent stability is too low. However, such a tool tends to have pendulum movements that run along the extension of the chisel edge, so that vibrations occur when machining a workpiece. These vibrations overlap with the rotational movement of the tool, resulting in a short service life of the tool. What is more, cylindrical holes cannot be produced due to such vibrations. Finally, guide surfaces of the tool are also heavily loaded by pendulum movements.

In the case of metal drilling tools of the type referred to here, which have three primary cutting edges and thus also three chisel edge segments, the guidance of the tool is improved insofar as pendulum movements can be at least partially suppressed. However, it is necessary to apply relatively large pressing forces when machining a workpiece.

It is therefore the object of the invention to provide a metal drilling tool that avoids these drawbacks.

To achieve this object, a metal drilling tool—hereinafter also referred to as "drilling tool" for short—is proposed which has the features named in claim 1. It has a middle axis, a peripheral surface, a front side and an opposite end, at least two primary cutting edges arranged in the region of the front side with associated clearance surfaces that emanate from the peripheral surface of the tool. The at least two primary cutting edges are arranged on an imaginary first conical surface that is arranged so as to be concentric with the middle axis, the conical surface having a first cone angle that opens up in the direction of the opposite end and represents the apex angle of the metal drilling tool. The first cone angle can be up to 180°. It is thus also possible for the primary cutting edges to lie on an imaginary plane on which the middle axis stands perpendicularly. The tool according to the invention is characterized by a centering portion having at least three edges, at least three side surfaces, and an imaginary base surface and is characterized in that at least two of the edges lie on an imaginary second conical surface that is arranged so as to be concentric with the middle axis and has a second cone angle that opens up in the direction of the opposite end. This is smaller than the angle formed by the primary cutting edges with one another, so that the imaginary second conical surface, as seen from the opposite end, projects opposite the front side. This results in a central raised area on the front side of the metal drilling tool that acts as a centering point with which the tool first penetrates into a workpiece during the machining thereof, thereby guiding the tool. During the machining of a workpiece, the centering portion stabilizes the metal drilling tool in the borehole produced. It has been found that the sharper the second cone angle, the better the tool is centered in the workpiece. However, it has also been found that such centering portions are more prone to break.

Due to the fact that such a tool dispenses with a chisel edge or chisel edge segments are replaced by the centering portion, better drilling properties are achieved in the region of the metal drilling tool near the center than is the case with conventional chisel edges. The drilling properties are improved in that the metal drilling tool exhibits only minimal torsional and axial vibrations when machining a workpiece. The tendency to chatter is also greatly reduced. This results in a high level of running smoothness, so that the roundness and the surface quality of the borehole produced are substantially improved. It is also possible to comply with tighter bore tolerances with the tool according to the invention described herein. Moreover, the cylindricity of a bore is improved due to the drilling properties given here. It has also been found that, by virtue of the centering portion provided here, a higher feed rate is possible during the machining of a workpiece. Since the improved guidance of the tool relieves the guide surfaces thereof, a jamming of the tool in the machined workpiece is prevented. The improved centering also results in less heating of the workpiece. In this way, the wear on both the tool and the workpiece can be substantially reduced.

In the drilling tool being proposed here, the centering portion is provided in particular instead of the chisel edge, meaning that it replaces the chisel edge. In particular, the drilling tool proposed here does not have a chisel edge and is thus especially preferably free of a chisel edge. Instead, the chisel edge is replaced by the centering portion. A roundness of 10 μm can be achieved with the aid of the drilling tool, whereas a conventional drilling tool with a chisel edge typically produces a triangular out-of-roundness of 50 μm.

The base surface is particularly an imaginary base surface that preferably only exists as an imaginary geometric construction and is otherwise hidden in the material of the drilling tool, since the centering portion is preferably integral with at least one additional section of the drilling tool, particularly with the part of the drilling tool that has the primary cutting edges and the first clearance surfaces.

Preferably, the imaginary base surface is a regular polygon; at the same time, the center of this polygon is the base point of a height of the centering portion, particularly a tip of same.

Especially preferably, the base surface is a regular polygon, with the base surface having a midpoint, and with all edges of the centering portion that emanate from the tip thereof or meet at the tip being of equal length, the connecting section between the midpoint of the base surface on the one hand and the tip on the other hand being perpendicular to the base surface, so that the base point of the perpendicular from the tip is identical to the midpoint of the base surface, meaning that it lies in the interior of the base surface. The base surface can also not be a regular polygon but rather one having at least point symmetry, in which case a center of symmetry of this polygon coincides with the base centerpoint of the centering portion. In this case, the edges can have different lengths.

According to a development of the invention, a provision is made that the centering portion is arranged coaxially with the middle axis. The tip of the centering portion preferably lies on the middle axis.

If the centering portion is designed according to one of the previously described embodiments, it results in ideal self-centering with no or only greatly diminished occurrence of oscillatory movements of the drilling tool during the machining of a workpiece. The centering portion in the form of a centering point assumes the function of a tail center during the entire drilling process. This results in a very smooth operation, high stability, minimal torsional and axial vibrations, and no chatter. The borehole produced in this way has an increased precision of circularity, so that the formation of n-gonal holes is avoided. In particular, the borehole thus has better cylindricity. This results in tighter bore tolerances and improved process reliability. In addition, higher feed rates are possible during drilling. The drilling tool does not jam, and guide chamfers of the drilling tool are relieved thanks to the stabilizing tail center in the form of the centering portion, so that they remain intact for a longer time. The pressure on the guide chamfers is greatly reduced without diminished guidance. It also results in less heating of the workpiece.

These advantages are realized very especially when the centering portion is arranged coaxially with the middle axis, and particularly when the tip of the centering portion is located on the middle axis.

It is possible for the centering portion to have a square base surface and, particularly, four preferably equal side surfaces. In this case, the advantages already described are realized in a very special manner. The base surface can also have the shape of an equilateral triangle, in which case all three side surfaces are also preferably embodied so as to be particularly identical to one another and to the base surface—i.e., equilateral triangles of equal size.

In a preferred exemplary embodiment, the drilling tool has three primary cutting edges, with the centering portion having three edges and three equal side surfaces and a base surface that is the same as the side surfaces and embodied as an equilateral triangle.

In another preferred exemplary embodiment, the drilling tool has two primary cutting edges, with the centering portion having a square base surface with four preferably equal side surfaces.

Each of the primary cutting edges of the drilling tool is preferably associated with flutes that open—i.e., become wider—away from the front side and toward the opposite end. In particular, a cross section of the flutes increases when viewed from the front side toward the opposite end. This facilitates the removal of chips in the flutes.

In a preferred drilling tool, a provision is made that it has three primary cutting edges. In this case, the centering portion comprises three edges and three side surfaces. The primary cutting edges of the tool transition into the three edges of the centering portion via a bend or bent region. In addition, the clearance surfaces of the three primary cutting edges transition into the side surfaces of the centering portion via a bend or bent region, the centering portion having a triangular imaginary base surface in this exemplary embodiment. The profile of the edges and side surfaces is selected such that the centering portion rises above—i.e., protrudes out of—the front surface in the feed direction of the drilling tool on the end face.

The transition of the primary cutting edges and the clearance surfaces into the corresponding regions of the centering portion can thus occur by means of a bend, i.e., more or less abruptly. However, it is also possible to provide a bent region in the transition between the cutting edges and edges or clearance surfaces and side surfaces of the centering portion, thus resulting in a more or less soft transition that can be adapted through the selection of the radius of curvature in the bent region to various materials of workpieces to be machined.

In the present exemplary embodiment with three primary cutting edges and three edges in the region of the centering portion, a provision is preferably made that all three edges lie on the imaginary first conical surface.

In a preferred exemplary embodiment of the drilling tool with two primary cutting edge, a provision is made that the centering portion has four edges and four side surfaces. In that case, the two primary cutting edges transition into two opposing edges of the centering portion via a bend or bent region, and the two clearance surfaces of the primary cutting edges transition into two opposing side surfaces. The centering portion thus has two side surfaces that are situated pairwise opposite one another and into which the clearance surfaces transition, and two additional side surfaces that are arranged pairwise therebetween. The base surface of the centering portion is square, although it is possible to provide base surfaces that are quadrangular or also embodied as a parallelogram.

In the exemplary embodiment described here, a provision is made that at least two of the edges of the centering portion, particularly the opposing edges adjoining the two primary cutting edges, lie on the second conical surface. The other two edges can jump back relative to the second conical surface. Preferably, however, all four edges lie on the second conical surface, so that they engage evenly with the material of the workpiece to be machined.

In another preferred exemplary embodiment, a provision is made that a respective second clearance surface adjoins the ends of the first clearance surface facing away from the primary cutting edges and drops off from the primary cutting edges facing away from the first clearance surfaces at a second clearance angle toward the opposite end of the tool. This type of configuration is possible with both three- and double-edged drilling tools, and also with tools comprising a larger number of primary cutting edges.

When the drilling tool is configured in this way, particularly with two primary cutting edges, it is possible for two side surfaces of the centering portion to form a continuation of the first clearance surface, as stated above. They are situated opposite one another. The two other side surfaces of the centering portion lying between these side surfaces are formed by regions of the second clearance surfaces that are inclined at a different clearance angle than the first clearance surfaces.

It is thus possible for two side surfaces that are situated pairwise opposite one another to form another angle with one another than the other two of the four side surfaces of the centering portion.

In a preferred exemplary embodiment of the drilling tool, a provision is made that the following specifications are made for the first cone angle $\alpha$: The angle $\alpha$ preferably lies in a range from $120° \leq \alpha \leq 180°$, particularly in a range from $120° \leq \alpha \leq 180°$, more particularly in a range from $130° \leq \alpha \leq 150°$.

As noted, the first cone angle forms the apex angle of the drilling tool in the region of the primary cutting edges. It can be selected as a function of the material of the workpiece to be machined. In practice, the angles listed here have proven to be particularly expedient.

Accordingly, a provision is made in a preferred exemplary embodiment of the drilling tool that, for the second cone angle β, the precondition applies that it is smaller than the angle formed by the primary cutting edges. It is therefore less than 180° if these lie on an imaginary plane on which the middle axis stands perpendicularly, or it is smaller than the first cone angle α. Finally, a provision is made that the second cone angle β is preferably selected so as to lie in a range from $80° \leq β \leq 150°$, particularly in a range from $90° \leq β \leq 140°$.

The softer the material of the workpiece to be machined, the more acute the second cone angle that can be selected.

The second cone angle β forms the apex angle of the drilling tool in the region of the centering portion.

A preferred exemplary embodiment of a drilling tool with three primary cutting edges is characterized in that the three side surfaces of the centering portion form an angle δ with the middle axis of the tool. Preferably, all three side surfaces are inclined at the same angle δ relative to the middle axis. It lies in a range from $25° \leq δ \leq 65°$, preferably in a range of $35° \leq δ \leq 55°$.

Another preferred exemplary embodiment with two primary cutting edges is characterized in that the centering portion has two side surfaces situated pairwise opposite one another that form an angle γ that opens at the opposite end and for which the following applies: $60° \leq γ \leq 150°$, particularly $80° \leq γ \leq 120°$. Preferably, all of the opposing side surfaces of the centering portion form the same angle γ with one another.

In a preferred exemplary embodiment, a provision is made that not all edges intersect in the region of the middle axis, but rather that a chisel edge is provided at the tip of the centering portion that is arranged between the edges of the centering portion, which transition into the two primary cutting edges. This exemplary embodiment is thus implemented in drilling tools comprising two cutting edges. Such a configuration ensures that the tip of the centering portion lying on the middle axis is not so sensitive and therefore does not break off so easily during the machining of a workpiece.

The centering portion described here serves to avoid the drawbacks of chisel edges provided in conventional drilling tools. In order not to compromise or even give up the advantages provided by the centering portion, a provision is made that the length of the abovementioned chisel edge is very small and preferably only less than 6%, particularly less than 2%, of the diameter of the drilling tool.

In another exemplary embodiment of the drilling tool, a provision is made that the diameter of a perimeter around the imaginary base surface of the centering portion is smaller than the diameter of the drilling tool, particularly 3% to 14% at most, especially preferably constituting 5% to 12% of the diameter of the drilling tool. It has proven advantageous if the diameter of the perimeter around the imaginary base surface of the centering portion is selected as a function of the material hardness of the workpiece to be machined. A provision is preferably made that the harder the material of the workpiece to be machined, the smaller the diameter of the perimeter around the imaginary base surface of the centering portion is.

In another preferred exemplary embodiment of a drilling tool, a provision is made that at least one of the side surfaces of the centering portion is provided with a gash. This configuration is characterized in that the cutting face of the associated edge of the centering portion is reduced, thus improving chip removal. The transition of the centering portion is formed by the gashes, which preferably have a distance ahead of center that defines the width of the centering portion as measured perpendicular to the diameter line. The length of the centering portion as measured in the direction of the diameter line is defined by the region in which the first clearance surfaces of the primary cutting edges transition into a side surface of the centering portion.

In another preferred exemplary embodiment, a provision is made that each of the at least two primary cutting edges transitions into a secondary cutting edge, with guide surfaces being respectively associated with the secondary cutting edges, preferably in the region of the peripheral surface, so that the drilling tool is optimally guided in a produced borehole, thus relieving the cutting edges.

In another preferred exemplary embodiment of the drilling tool, a provision is made that the angular pitch of the at least two primary cutting edges is asymmetrical. As a result, the tendency of the drilling tool to chatter when machining a workpiece is reduced.

Each of the at least two primary cutting edges is arranged or formed on a web of the drilling tool, with the webs associated with the primary cutting edges being preferably of different sizes—when viewed in the circumferential direction—if the angular pitch of the primary cutting edges is asymmetrical. In particular, at least one first web that is arranged in the region of a larger pitch angle—this larger pitch angle being greater than at least one other pitch angle—is embodied so as to be greater than at least one other, second web of the drilling tool, with the first web being preferably associated in the region of the larger pitch angle with a second guide chamfer in addition to a first guide chamfer. The first web thus preferably has two guide chamfers that are preferably spaced apart from one another in the circumferential direction. The fact that the first web is larger than at least one other web means, in particular, that the first web arranged in the region of the greater pitch angle is widened in the circumferential direction in comparison to the at least one other, second web.

In another preferred exemplary embodiment, a provision is made that the drilling tool is embodied as an insert for a drill body. This enables a modular tool system to be realized. It is thus easy and, in particular, cost-effective to adapt this insert to various applications and to replace it when the cutting edges wear out. It is therefore not necessary to dispose of the complete tool due to wear.

Finally, an exemplary embodiment is preferred that is characterized in that at least one coolant and/or lubricant supply is provided. During the machining of a workpiece, it is particularly the region of the drilling tool that engages with the workpiece that is cooled and/or lubricated, so that the wear on the tool on the one hand and the load on both the workpiece and the workpiece on the other hand, particularly the thermal loading thereof, is reduced.

The coolant and/or lubricant supply is preferably embodied as an internal coolant/lubricant supply. In particular, the drilling tool preferably has at least one internal coolant/lubricant channel that leads to an opening in the front side, so that coolant/lubricant can be supplied to the primary cutting edges via the at least one internal coolant/lubricant channel during the machining of a workpiece. The at least one coolant/lubricant channel preferably leads to a clearance surface of the drilling tool, particularly to a first clearance surface and/or a second clearance surface adjoining the first clearance surface.

All in all, the centering portion described here affects optimum centering of the tool during the machining of a workpiece. Therefore, tools of the type referred to here for cutting inserts or drill heads of modular drilling tools having a base body made of tool steel are especially advantageous. To wit, such base bodies have substantially less stability than comparable solid-carbide or all-ceramic tools. The effective self-centering of the tool is therefore particularly important and advantageous.

Tools with a centering portion of the type referred to here are especially advantageous when using ultra-hard cutting materials such as carbide, cutting ceramic, or polycrystalline diamond (PCD), because such cutting materials have outstanding resistance to pressure and wear. As a result, the sharpness of the edges of the centering portion is retained for a long time.

The drilling tool preferably has solid carbide, or consists of solid carbide, at least in the region of the primary cutting edges and in the region of the centering portion. Alternatively, it is possible for the drilling tool has solid ceramic at least in the region of the primary cutting edges and the centering portion. Preferably, the drilling tool is made of solid ceramic.

The invention is explained below in further detail with reference to the drawing. In the drawing.

Figure 1:
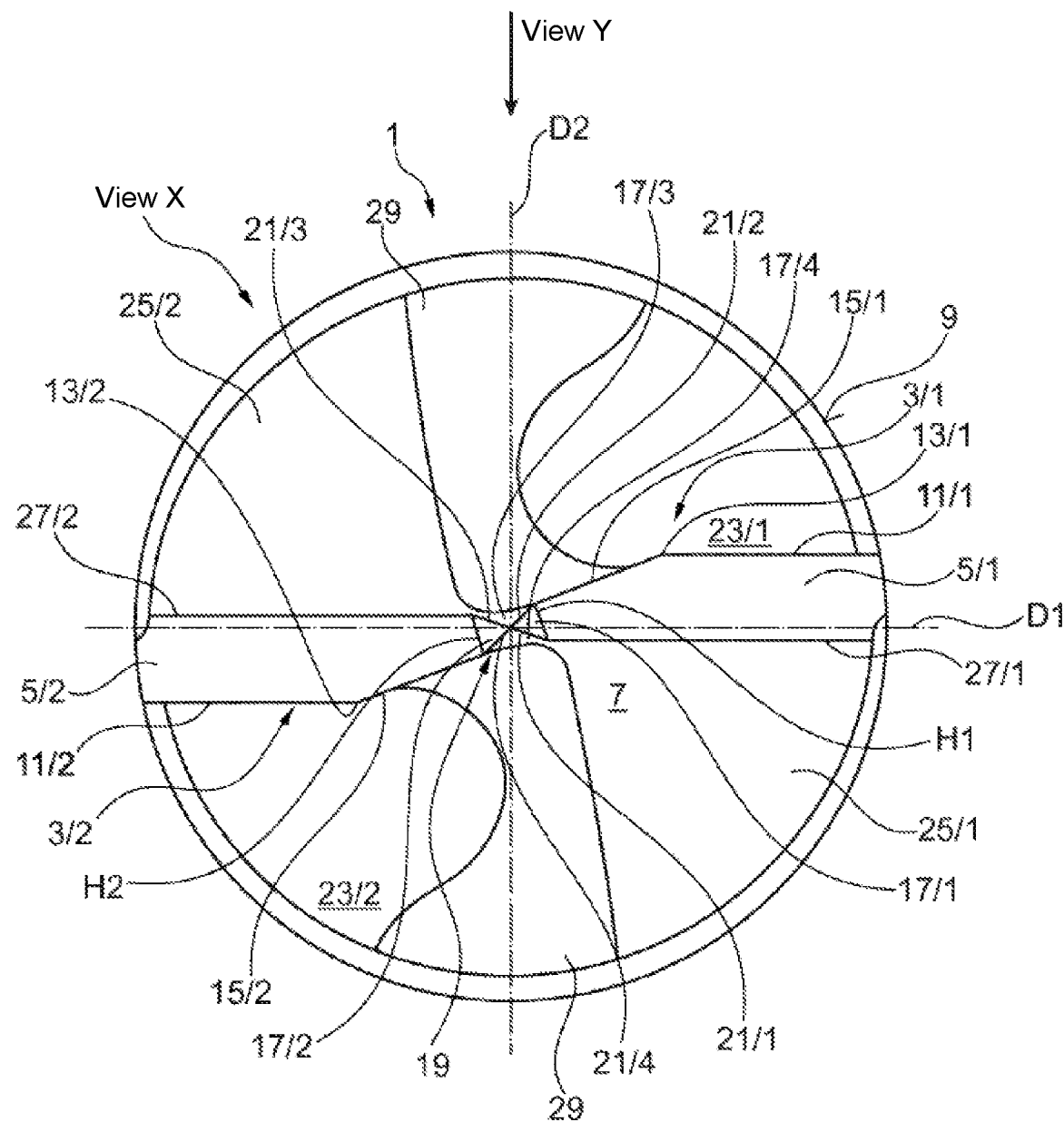
FIG. 1 shows a schematic diagram of a front-side view of a first exemplary embodiment of a metal drilling tool.

A first exemplary embodiment of a metal drilling tool 1 comprising two primary cutting edges 3/1 and 3/2 can be seen from the schematic diagram of FIG. 1. First clearance surfaces, namely a first first clearance surface 5/1 and a second first clearance surface 5/2, adjoin the primary cutting edges 3/1 and 3/2. These emanate from the primary cutting edges 3/1 and 3/2 and drop off into the image plane.

FIG. 1 shows a plan view of the front side 7 of the metal drilling tool 1, which is referred to below as a drilling tool or tool for short. The opposite end of the drilling tool 1 (not shown here) is at a distance from the image plane of FIG. 1.

The first clearance surfaces 5/1 and 5/2 extend inward from a circumferential surface 9 of the drilling tool 1. It is possible for the primary cutting edges 3/1 and 3/2 to have differently shaped primary cutting edge portions.

In the exemplary embodiment shown here, the primary cutting edges 3/1 and 3/2 are identical. They have an outer first and an adjoining inner second primary cutting edge portion. This will be explained with reference to the primary cutting edge 3/1. A first primary cutting edge portion 11/1 emanates from the circumferential surface 9, for example, and extends parallel to an imaginary diameter line D1 that runs horizontal here. This primary cutting edge portion 11/1 transitions here via a bend 13/1 into a second primary cutting edge portion 15/1, which drops off at an acute angle in the direction of the diameter line D1. The primary cutting edge portions 11/1 and 15/1 are reproduced here by way of example. It is quite possible for the first primary cutting edge portion 11/1 to be concavely arched, i.e., to approach the diameter line D1 arcuately from its starting point on the circumferential surface 9 and then rise again in an arc to the bend 13.

The second primary cutting edge 3/2 is embodied so as to be point-symmetrical to the first primary cutting edge 3/1.

The second primary cutting edge portion 15/1 does not reach the middle axis of the tool 1, which is perpendicular to the image plane of FIG. 1 and located at the intersection of the imaginary first diameter line D1 and an imaginary vertical second diameter line D2.

The clearance surfaces 5/1 and 5/2 are point-symmetrical, so that the following remarks concerning the first first clearance surface 5/1 also apply to the second first clearance surface 5/2.

The first first clearance surface 5/1 extends from the circumferential surface 9 in the direction of the middle axis to an auxiliary line H1 that is shown in FIG. 1. Starting from the region of the auxiliary line H1, the first first clearance surface 5/1 rises in the direction of the observer so as to form a first side surface 17/1 of a centering portion 19 that is bordered to the right and left of a first edge 21/1 and a second edge 21/2 of the centering portion 19. It tapers into a point, with its tip lying on the middle axis M. The first side surface 17/1 and a corresponding, opposing second side surface 17/2 of the second first clearance surface 5/2 are constructed identically and extend at an equal angle starting from the first clearance surfaces 5/1 and 5/2 and rising to the middle axis of the drilling tool 1, with the second side surface 17/2 being bordered by a third edge 21/3 and a fourth edge 21/4. A third side surface 17/3 and a fourth side surface 17/4 lie here between the two opposing first and second side surfaces 17/1 and 17/2. The two opposing third and fourth side surfaces 17/3 and 17/4, together with the first side surface 17/1 and the second side surface 17/2, form a centering portion 19 that extends out of the image plane of FIG. 1 and out of the front side 7 in the direction of the observer.

The auxiliary lines H1 and H2 indicate bends in the transitional region between the first clearance surfaces 5/1 and 5/2 to the first and second side surfaces 17/1 and 17/2 of the centering portion 19. However, it is also possible here for an arcuate transition to be realized over which the first clearance surfaces 5/1 and 5/2 transition into said side surfaces 17/1, 17/2.

It should be noted here that, of the four edges 21/1, 21/2, 21/3, 21/4 of the centering portion 19 in the first exemplary embodiment, at least two are on the imaginary second conical surface, particularly those edges which transition into the associated primary cutting edges.

In FIG. 1, a first chip space 23/1 can be seen above the first primary cutting edge 3/1. Accordingly, a second chip space 23/2 can be seen below the second primary cutting edge 3/2. The chip spaces 23/1 and 23/2 serve to carry away chips removed by the primary cutting edges 3/1 and 3/2.

Below the first first clearance surface 5/1, a first second clearance surface 25/1 that is associated therewith can be seen in FIG. 1. Accordingly, a second second clearance surface 25/2 is provided above the second first clearance surface 5/2. The second clearance surfaces 25/1, 25/2 adjoin the ends of the first clearance surfaces 5/1, 5/2 facing away from the primary cutting edges 3/1, 3/2. They are more inclined than the first clearance surfaces 5/1 and 5/2. The first and second clearance surfaces 5/1 and 25/1 as well as 5/2 and 25/2 merge into one another, here via a bend 27/1, 27/2 indicated by a line. The second clearance surfaces 25/1 and 25/2 extend from these bends in the direction of the end (not shown here) of the tool 1 opposite from the front side 7. Instead of bends, arcuate transitional regions can also be provided. In the exemplary embodiment shown here, the chip spaces 23/1 and 23/2 do not border the second primary cutting edge portions 15/1 and 15/2 or do not do so over their entire length. Rather, a respective gash 29/1, 29/2 is provided here. Gashes are known, so they will not be discussed further here.

The second primary cutting edge portions 15/1 and 15/2 transition into one another via the second and fourth edges 21/2 and 21/4 of the centering portion 19. It is of crucial importance here that conventional chisel edges be omitted and, instead, the edges 21/2 and 21/4 of the centering portion 19 mentioned here projecting out of the image plane of FIG. 1 interconnect the ends of the second primary cutting edge portions 15/1 and 15/2 facing toward the middle axis.

In any case, the edges 21/2 and 21/4 of the centering portion 19 mentioned here form edges that engage with a workpiece that is being machined by means of the tool 1. Chips removed from these edges travel on the associated third and fourth side surfaces 17/3 and 17/4 of the centering portion 19 into the region of the gash 29 and, from there, into the region of the chip spaces 23/1 and 23/2. These edges 21/2, 21/4 are characterized by a negative rake angle. The machining of the workpiece by these edges 21/2, 21/4 is therefore more likely to be called scraping. Consequently, no positive chip removal occurs here as is the case in the region of the primary cutting edge 3/1 or 3/2, where there is a positive rake angle.

At the same time, the tool 1 is also machined in a scraping manner by the first edge 21/1 and the third edge 21/3. Machining by scraping is thus performed by all four edges 21/1, 21/2, 21/3, 21/4.

In general, scraping is preferably carried out with all edges of the centering portion 19, i.e., particularly either with all four edges 21/1, 21/2, 21/3, 21/4 in the exemplary embodiments illustrated here or with all three edges 21/1, 21/2, 21/3.

By virtue of the fact that the centering portion 19 is in scraping engagement with the workpiece with all of its edges, it can perform the function of a tail center that stabilizes the drilling tool 1 over the entire drilling process, thus contributing to a high level of smoothness and stability and minimal torsional and axial vibrations. In particular, the centering portion 19 can thus act as a centering point.

The centering portion 19 explained with reference to FIG. 1 rises over the front side 7 out of the image plane of FIG. 1. It has an imaginary base surface that is substantially rectangular. It is also possible to realize centering portions 19 having a square or parallelogram-shaped base surface.

Figure 2:
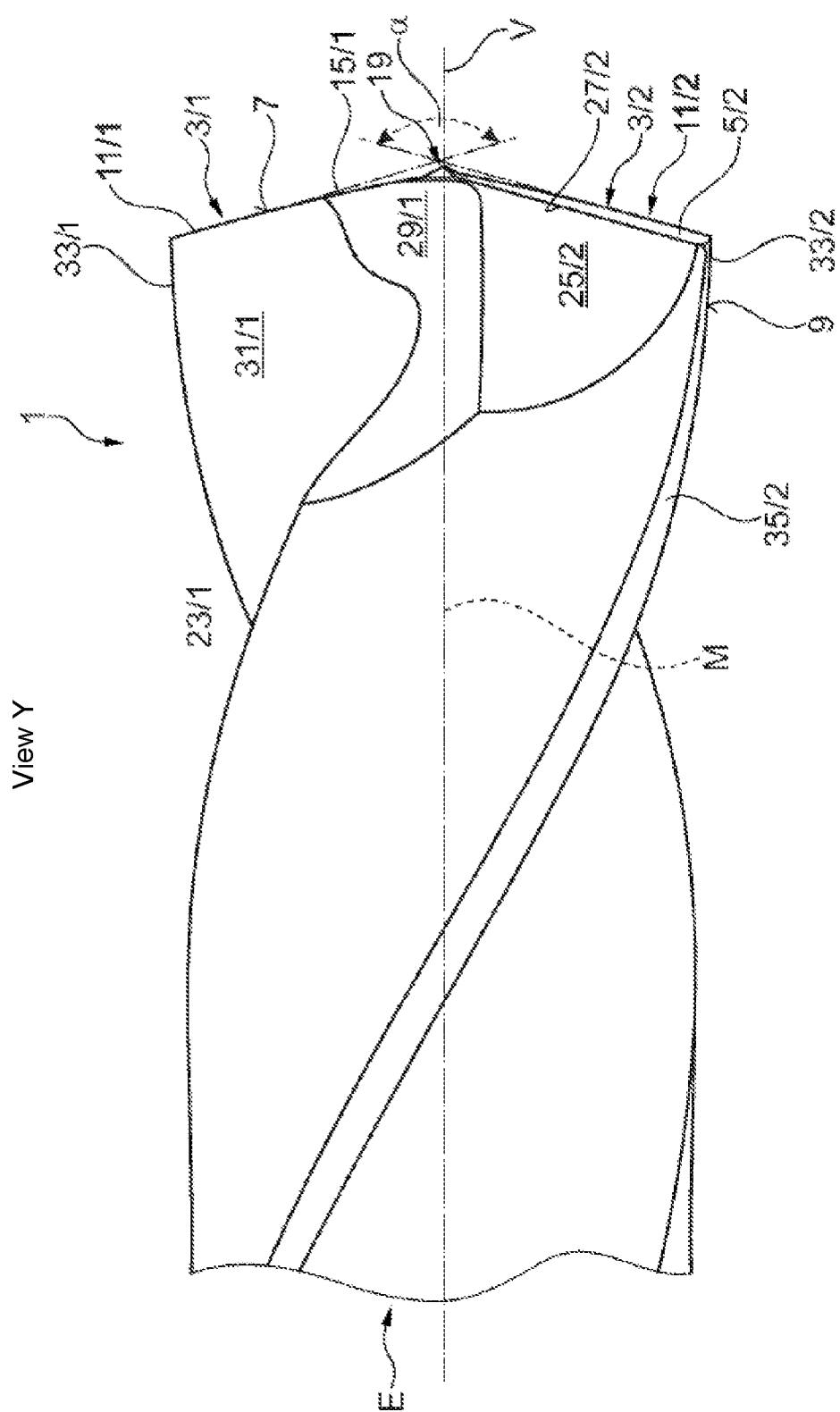
FIG. 2 shows a schematic diagram of the first exemplary embodiment in a side view (view Y)

The schematic diagram according to FIG. 2 shows a side view of the first exemplary embodiment of the drilling tool 1 reproduced in FIG. 1, namely from view Y, the orientation of which is indicated in FIG. 1.

Same and functionally analogous parts are provided with the same reference symbols, so reference is made in that regard to the description in relation to FIG. 1.

In the first view illustrated here above the midline M, the schematic diagram of FIG. 2 shows the first primary cutting edge 3/1, as well as the first cutting face 31/1 bordering the first chip space 23/1 thereof that is associated with the first primary cutting edge portion 11/1 and a portion of the second primary cutting edge portion 15/1. Also visible is the gash 29/1 which forms the cutting face for the remaining portion of the second primary cutting edge portion 15/1. Chips removed from the first primary cutting edge 3/1 are thus guided from the first cutting face 31/1 and from the gash 29/1 into the first chip space 23/1. This configuration is also provided point-symmetrically for the second primary cutting edge 3/2.

The second primary cutting edge 3/2 adjoining the second first clearance surface 5/2 to the left can be seen below the midline M. This transitions via the bend 27/2 into the second second clearance surface 25/2.

It can be seen from FIG. 2 that, in this exemplary embodiment, the first and second primary cutting edges 3/1 and 3/2 drop off to the left in the direction of the end E opposite the front side 7 relative to a plane on which the middle axis M stands perpendicularly. The two primary cutting edges 3/1, 3/2 lie on an imaginary first conical surface having a first cone angle α that opens in the direction of the opposite end E. For the sake of better clarity, the first cone angle α is indicated here by means of auxiliary lines that rest against the first primary cutting edge portions 11/1 and 11/2, which lie at a greater distance from the middle axis M than the second primary cutting edge portions 15/1 and 15/2 reproduced in FIG. 1.

It is expressly noted that, in an exemplary embodiment that is not illustrated here, the two primary cutting edges 3/1 and 3/2 can also lie on an imaginary plane on which the middle axis M stands perpendicularly, in which case the first cone angle α is then 180°.

It can be seen from FIG. 2 that, when viewed from the end E opposite from the front side 7, the centering portion 19 lying concentrically with the middle axis M projects from the front side 7, i.e., in the direction of advancement, which is indicated by an arrow V. The drilling tool 1 moves in this direction relative to a workpiece to be machined (not shown here) if a borehole is to be introduced there. In principle, it is possible to set the workpiece in rotation and move it relative to the drill—which is stationary when viewed toward the middle axis M—in order to introduce a borehole there. It is assumed here, however, that the drill rotates relative to the workpiece about the middle axis M and in the direction of the arrow V, i.e., in the direction of advancement, and that the centering portion 19 protrudes in this direction from the front side 7.

Each of the primary cutting edges 3/1 and 3/2 is adjoined on the outside in the region of the circumferential surface 9 by secondary cutting edges 33/1 and 33/2, with which guide surface 35/2 is associated, with only the second guiding surface 35/2 of the second secondary cutting edge 33/2 being visible. The guide surfaces 35/2 can be formed by flat surfaces adjoining the secondary cutting edges 33/1, 33/2 or by so-called circular grinding chamfers. The drilling tool 1 is supported by means of these surfaces during the machining of a workpiece. Guide surfaces of the type referred to here are known, so they will not be discussed further here.

Figure 3:
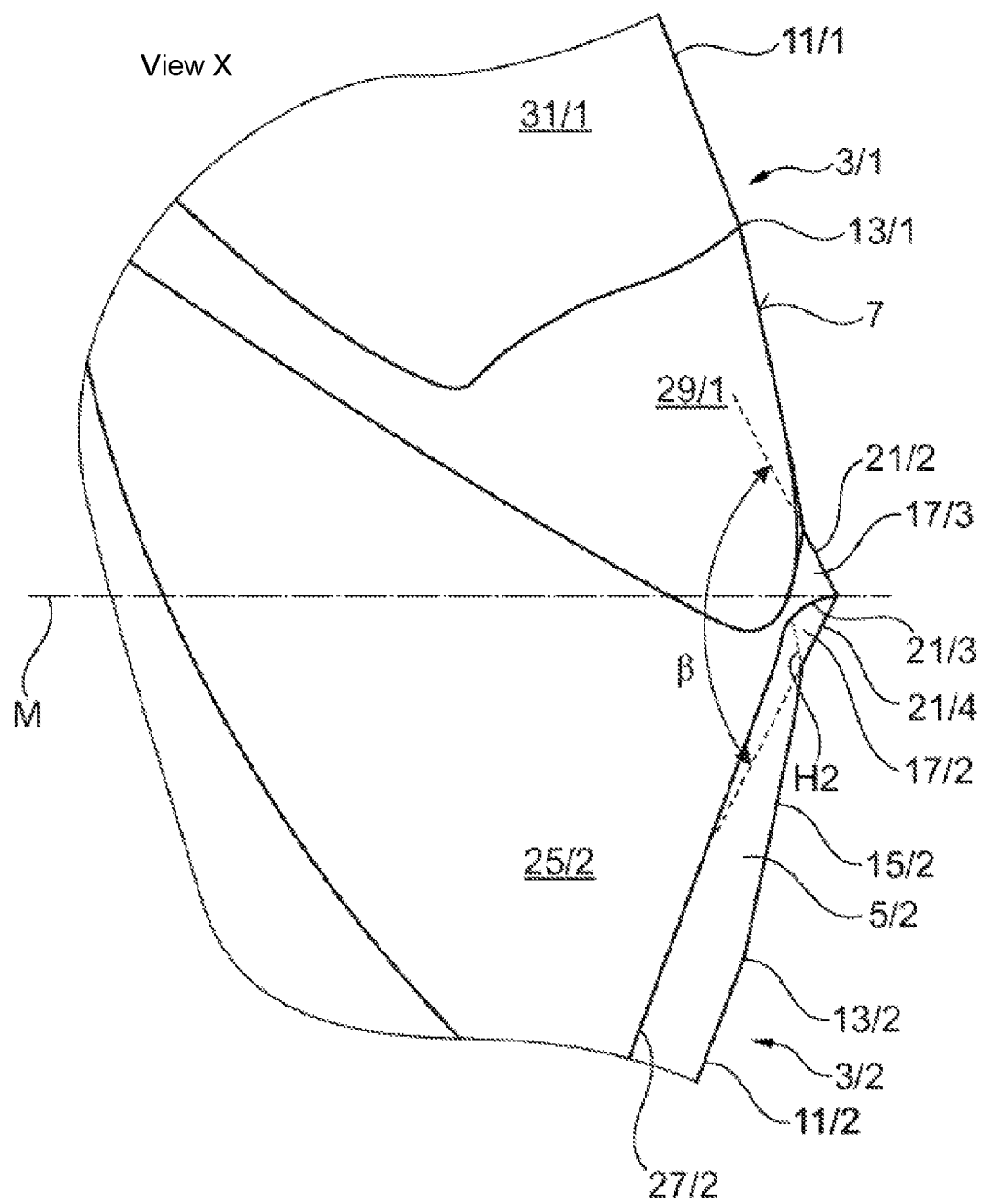
FIG. 3 shows a schematic diagram of the first exemplary embodiment in a second side view (view X)

FIG. 3 shows a schematic diagram of the first exemplary embodiment of the drilling tool 1 in a second side view, which is also referred to as view X according to the information in FIG. 1.

In FIG. 3, the front end—that is, the end having the front side 7—is enlarged. Same and functionally analogous elements are provided with the same reference symbols, so reference is made in that regard to the preceding description.

The second primary cutting edge 3/2 can be seen below the midline M, as well as the first clearance surface 5/2 and the second clearance surface 25/2 adjoining same via the bend 27/2.

Above the midline M, the first primary cutting edge 3/1 can be seen with the outer, first primary cutting edge portion 11/1, with the term "outer" indicating that this first primary cutting edge portion 11/1 is arranged at a greater distance from the middle axis M than the second primary cutting edge portion 15/1.

The illustration according to FIG. 3 shows that the first cutting face 31/1, which borders the first chip space 23/1, adjoins the first primary cutting edge portion 11/1. The gash 29/1, whose side wall forms the cutting face for the second primary cutting edge portion 15/1 at least in some areas, is adjacent to this second primary cutting edge portion 15/1 above the midline M.

It can be clearly seen from the enlarged view of FIG. 3 that the centering portion 19 protrudes beyond the front side 7, so that when the tool 1 shown here is used, the centering portion 19 comes into engagement with a workpiece first when a borehole is to be introduced into same by means of the drilling tool 1.

The view according to FIG. 3—that is, view X as indicated in FIG. 1—shows the third side surface 17/3 of the centering portion 19 that is bordered by the third edge 21/3 and the second edge 21/2. The second side surface 17/2 as well as the auxiliary line H2 can be seen below the third edge 21/3.

It was explained with reference to FIG. 1 that the first clearance surfaces 5/1 and 5/2 continue into the first and second side surfaces 17/1 and 17/2 of the centering portion 19 via a bend or bent region indicated by the auxiliary lines H1, H2. The view according to FIG. 3 shows that the second first clearance surface 5/2 continues into the second side surface 17/2. The fourth side surface 17/4 is located on the side facing away from the observer of the centering portion 19.

Above the midline M, the first primary cutting edge 3/1 continues from the first primary cutting edge portion 11/1 via the second primary cutting edge portion 15/1 into the second edge 21/2 of the centering portion 19. It can be seen from the plan view according to FIG. 1 that the second edge 21/2 continues beyond the middle axis into the fourth edge 21/4.

Together with the opposing fourth edge 21/4 forming the continuation of the second primary cutting edge 3/2, the second edge 21/2 forms an angle corresponding to the second cone angle β of the imaginary second conical surface.

It is readily apparent from the schematic diagram of FIG. 3 that first cone angle α reproduced in FIG. 2 and the second cone angle β indicated here in FIG. 3 are different in size; namely, the first cone angle α is greater than the second cone angle β. As a result, the centering portion 19 rises to the right with a smaller second cone angle β over the front surface 7 here in FIG. 3 and forms a centering point.

To summarize and supplement the explanations of the first exemplary embodiment of the drill 1 as shown in FIGS. 1 to 3:

The first cone angle α is selected in a range from $120° \leq α \leq 180°$, particularly in a range from $120° \leq α \leq 180°$, preferably in a range from $130° \leq α \leq 150°$.

The second cone angle β is smaller than the angle formed by the primary cutting edges, meaning that it is smaller than 180°, when the primary cutting edges 3/1 and 3/2 lie in an imaginary plane, or smaller than the first cone angle α when the primary cutting edges 3/1 and 3/2 lie on an imaginary conical surface with opening angle<180°. Moreover, a provision is made for the second cone angle that it lies in a range from $80° \leq β \leq 150°$, preferably in a range from $90° \leq β \leq 140°$.

For the exemplary embodiment shown here with a centering portion 19 having four edges 21/1 to 21/4, it holds that the side surfaces lying between the edges 17/1 to 17/4 are arranged in pairs opposite one another. The first and second side surfaces 17/1 and 17/2, which are associated with the first clearance surfaces 5/1 and 5/2, form an angle between them that opens in the direction of the end of the drill 1 opposite the front side 7. This opening angle is designated as γ. It lies in a range from $60° \leq γ \leq 150°$, particularly from $80° \leq γ \leq 120°$. Preferably, both side surfaces 17/1, 17/2, 17/3, 17/4 that are arranged pairwise opposite one another form this angle γ between them, with a provision made in particular that each of the two side surface pairs form the same angle between them.

Figure 4:
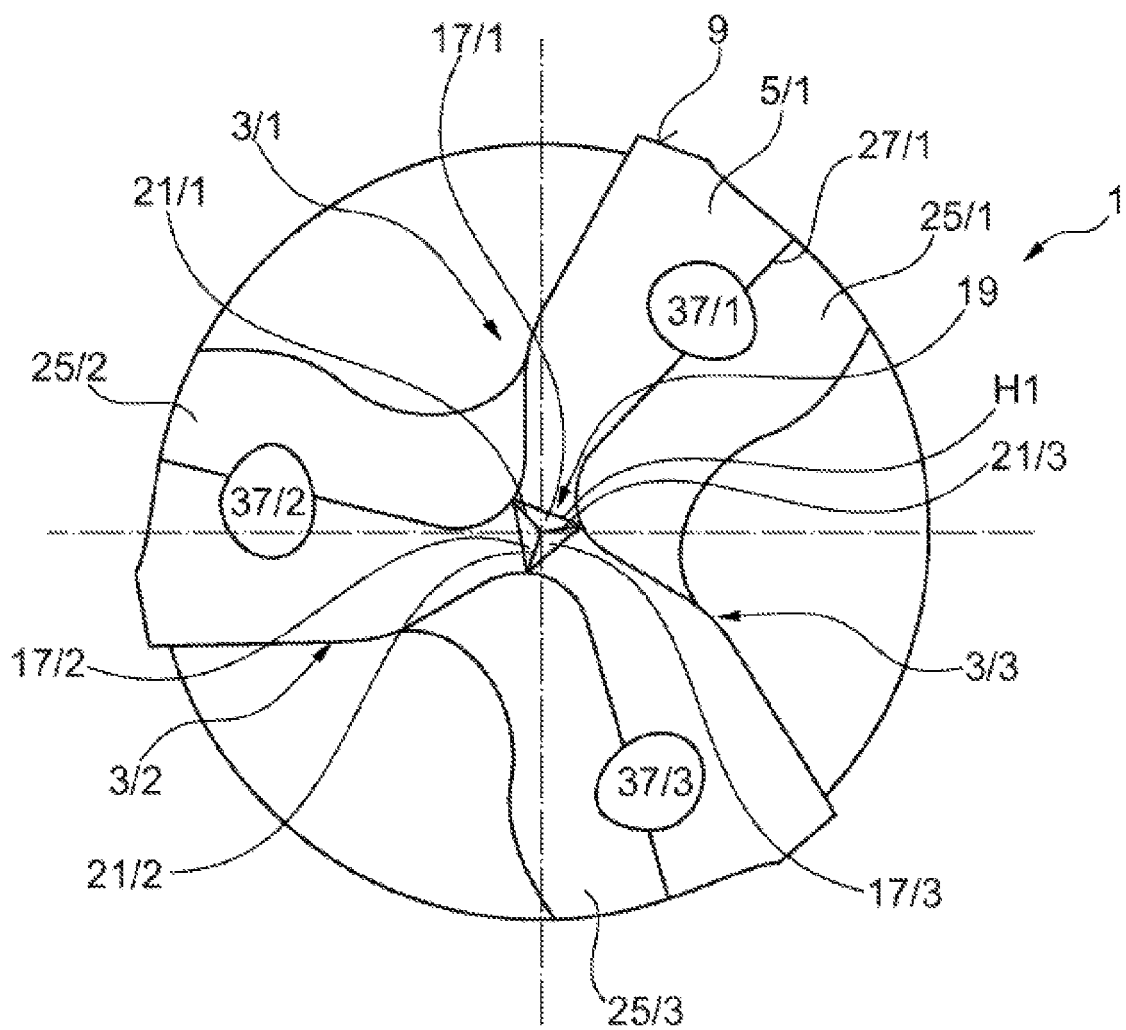
FIG. 4 shows a schematic diagram of a second exemplary embodiment of a metal drilling tool in a front view.

FIG. 4 shows a schematic diagram of a plan view of the front side 7 of a second embodiment of a metal drilling tool 1, which is referred to here as a drilling tool 1 for short. While FIGS. 1 to 3 show a drilling tool 1 with two primary cutting edges 3/1, 3/2, FIG. 4 shows a drilling tool 1 in a front-side view that has three primary cutting edges 3/1, 3/2, 3/3. All three primary cutting edges 3/1, 3/2, 3/3, together with the associated clearance surfaces, cutting faces, and the like, are identical, so that the following explanations refer to a first primary cutting edge 3/1. In FIG. 4, the two other primary cutting edges are denoted 3/2 and 3/3. The corresponding elements that are associated with the primary cutting edges bear the corresponding numerical signifiers; for example, 5/1 stands for the first clearance surface of the first primary cutting edge 3/1, 5/2 for the first clearance surface of the second primary cutting edge 3/2, and 5/3 for the first clearance surface of the third primary cutting edge 3/3.

The primary cutting edges 3/1, 3/2, 3/3 extend from a circumferential surface 9 of the drilling tool 1 and in a straight line therefrom, as shown here, or along a concave line, and form a first primary cutting edge portion 11/1 here, respectively. Via a bend 13/1, the first primary cutting edge portion 11/1 continues in a second primary cutting edge portion 15/1, which finally ends at a centering portion 19. This has a triangular base surface here.

The first primary cutting edge 3/1 continues into one of the edges—here into the first edge 21/1 of the centering portion 19. In the first exemplary embodiment, this extends in a bend or in arcuate fashion out of the plane on which the end of the second primary cutting portion 15/1 lies such that the first edge 21/1 rises from the image plane of FIG. 4 toward the observer.

Accordingly, the second primary cutting edge 3/2 continues into the second edge 21/2, and the third primary cutting edge 3/3 continues into the third edge 21/3 of the centering portion 19.

Clearance surfaces adjoin the primary cutting edges 3/1, 3/2, 3/3. The second embodiment of the drill 1 is configured analogously to the exemplary embodiment according to the preceding figures: The first clearance surface 5/1 adjoins the first primary cutting edge 3/1 and, starting from the first primary cutting edge 3/1, drops off into the image plane of FIG. 4, i.e., in the direction of the end (not shown here) opposite the front side 7.

Here, too, there is a second clearance surface 25/1 that continues via a bend 27/1 starting from the first clearance surface 5/1 and, in turn, drops off into the image plane of FIG. 4 starting from the bend 27/1, with the second clearance surface 25/1 being more inclined than the first clearance surface 5/1.

The first clearance surface 5/1 emanates from the circumferential surface 9 and extends to the centering portion 19. It is indicated by an auxiliary line H1 that the first clearance surface 5/1 transitions via a bend into a first side surface 17/1 of the centering portion 19. It is also possible for no bend to be provided, but rather a region to be bent upward toward the observer in the transition between the first clearance surface 5/1 and the first side surface 17/1.

The same applies to the other side surfaces 17/2 and 17/3 of the centering portion 19. Overall, a centering portion 19 is formed here with three edges 21/1, 21/2 and 21/3, with the side surfaces 17/1, 17/2 and 17/3 being provided between the edges 21/1, 21/2, 21/3.

In the exemplary embodiment illustrated here according to FIG. 4, a provision is made that the primary cutting edges 3/1 to 3/3 are arranged at least in part on an imaginary first conical surface having a first cone angle α that opens in the direction of the end E opposite the front side 7.

It is also possible, however, to realize an exemplary embodiment (not shown here) in which the three primary cutting edges 3/1, 3/2, 3/3 lie on an imaginary plane on which the middle axis M stands perpendicularly.

In the region of the centering portion 19, a provision is made that all three edges 21/1 to 21/3 lie on an imaginary second conical surface having a second second cone angle β that opens in the direction of the end E opposite the front surface 7. The preceding remarks in relation to the first embodiment apply analogously for the angles α and β.

It has been found that the tip of the centering portion 19 that acts as a centering point for the drilling tool 1 is quite sensitive in the case of a small second cone angle β and can break off. In this case, it is possible to flatten the tip of the centering portion 19 somewhat and to provide here a preferably very short chisel edge that is arranged between the edges 21/1, 21/2, 21/3 of the centering portion 19, which transition into the at least two primary cutting edges 3/1, 3/2, 3/3. Here as well, the chisel edge makes up no more than 6%, particularly no more than 2%, of the tool diameter.

In drilling tools 1 of the type referred to here, a provision is preferably made that a diameter of the perimeter around the base surface of the centering portion 19 is substantially smaller than the diameter of this drilling tool 1. It has proven particularly expedient to select the diameter of the perimeter in a range of from 2% to 15%, particularly from 5% to 12%, of the drill diameter.

In practice, tools also exist which have a drill body that is provided in the region of the front side 7 with a slot that extends along a diameter line. An insert is introduced into this that has the cutting edges and other features of the tool described above. In other words, a provision can very well be made to configure a drilling tool 1 with the features portrayed here as an insert for a drill body.

Finally, it is also possible to provide at least one coolant and/or lubricant supply both in the first exemplary embodiment according to FIGS. 1 to 3 and in the second exemplary embodiment according to FIG. 4. A coolant and/or lubricant is supplied under pressure via same when the tool 1 is used. In that case, openings are preferably provided (in the front side here) through which the coolant/lubricant is supplied to the cutting edges during the machining of a workpiece in order to lubricate and cool them. Three openings 37/1 to 37/3 are provided for the sake of example in FIG. 4 through which the coolant/lubricant made available by the coolant/lubricant supply can emerge.

Such openings 37/1, 37/2, 37/3 can also be provided in the embodiment of FIGS. 1 to 3. They are not shown in these figures, however.

The centering portion 19 is preferably arranged so as to be coaxial with the middle axis M. In particular, the tip of the centering portion 19 is preferably arranged so as to lie on the middle axis M.

An exemplary embodiment of the drilling tool 1 is preferred in which the centering portion 19 has a square base surface with four preferably identical side surfaces.

In the second embodiment shown in FIG. 4, the centering portion 19 has a base that is an equilateral triangle, it being preferred that it have three equal side surfaces that are preferably also equilateral triangles—preferably of the same size as the base surface.

The invention claimed is:

1. A metal drilling tool to introduce holes into metal workpieces through chip-removing comprising:
   a middle axis;
   a circumferential surface;
   a front side and an opposite end;
   at least two primary cutting edges arranged in a region of the front side, each primary cutting edge having a first clearance surface, the first clearance surfaces dropping off from the at least two primary cutting edges at a first clearance angle in a direction of the opposite end and extend from the circumferential surface over the front side, the at least two primary cutting edges lie on an imaginary first conical surface that is arranged so as to be concentric with the middle axis and has a first cone angle that opens up in the direction of the opposite end and is no more than 180°; and
   a centering portion having at least three edges, at least three side surfaces, and an imaginary base surface, the centering portion provided without a chisel edge, at least two of the edges lie on an imaginary second conical surface that is arranged so as to be concentric with the middle axis and has a second cone angle that opens up in the direction of the opposite end, the second cone angle being smaller than the first cone angle, such that that the imaginary second conical surface protrudes from the front side,
   wherein the at least two primary cutting edges each have an outer first cutting edge portion and an adjoining inner second primary cutting edge portion, each of the at least two primary cutting edges extending to at least one edge of the centering portion, and
   wherein the drilling tool is a metal drilling tool.

2. The drilling tool as set forth in claim 1, wherein the imaginary base surface has a shape selected from a group consisting of a regular polygon and a point-symmetrical polygon, with at least one of a midpoint and a center of symmetry of the shape being simultaneously a base point of a height of the centering portion.

3. The drilling tool as set forth in claim 1, wherein the centering portion is arranged coaxially with the middle axis, with a tip of the centering portion lying on the middle axis.

4. The drilling tool as set forth in claim 1, wherein the imaginary base surface of the centering portion is an equilateral triangle or a square.

5. The drilling tool as set forth in claim 1, wherein:
   the drilling tool has three primary cutting edges, with the centering portion having three edges and three side faces;
   the three primary cutting edges transition via a bend or via a bent region into the three edges of the centering portion;
   the clearance surfaces of the primary cutting edge transition via a bend or via a bent region into the side surfaces of the centering portion;
   all three edges of the centering portion lie on the imaginary second conical surface, and
   the imaginary base surface of the centering portion is triangular.

6. The drilling tool as set forth in claim 5, wherein the three side surfaces of the centering portion form together with the middle axis an equal angle in a range from at least 25° to no more than 60°.

7. The drilling tool as set forth in claim 1, wherein:
the drilling tool has two primary cutting edges, with the centering portion having four edges and four side surfaces;
the two primary cutting edges transition via a bend or via a bent region into two opposing edges of the centering portion;
the two clearance surfaces transition via a bend or via a bent region into two opposing side surfaces of the centering portion;
the imaginary base surface of the centering portion is square; and
at least two edges of the centering portion lie on the second conical surface.

8. The drilling tool as set forth in claim 1, further comprising a respective second clearance surface adjoining an end of the first clearance surface facing away from the at least two primary cutting edges and drops off from the end at a second clearance angle toward the opposite end.

9. The drilling tool as set forth in claim 1, wherein the first cone angle is at least 120° and less than 180°.

10. The drilling tool as set forth in claim 1, wherein the second cone angle is less than 180°.

11. The drilling tool as set forth in claim 1, wherein at least one of the side surfaces of the centering portion is provided with a gash.

12. The drilling tool as set forth in claim 1, wherein a width of the imaginary base surface of the centering portion measured along an imaginary diameter line is smaller than a diameter of the drilling tool.

13. The drilling tool as set forth in claim 1, further comprising a secondary cutting edge associated with each of the at least two primary cutting edges in a region of the circumferential surface of the drilling tool.

14. The drilling tool as set forth in claim 1, wherein the drilling tool is an insert for a drill body.

15. The drilling tool as set forth in claim 1, further comprising at least one coolant and/or lubricant.

16. The drilling tool as set forth in claim 1, wherein the outer first cutting edge portion and the adjoining inner second primary cutting edge portion of each of the at least two primary cutting edges are connected to one another at a bend.

17. The drilling tool as set forth in claim 16, wherein the bend defines an obtuse angle connecting the outer first cutting edge portion and the adjoining inner second primary cutting edge portion.

18. The drilling tool as set forth in claim 1, wherein the outer first cutting edge portion of each of the at least two primary cutting edges linearly extends from an outer perimeter of the drilling tool to the bend and the adjoining inner second primary cutting edge portion of each of the at least two primary cutting edges linearly extends from the bend to the centering portion.

19. The drilling tool as set forth in claim 1, wherein the drilling tool includes a middle axis radially bisecting the drilling tool, and wherein the first primary cutting edge portion is arranged at a greater distance from the middle axis than the second primary cutting edge portion.

* * * * *